US006801941B1

(12) United States Patent
Stephens et al.

(10) Patent No.: US 6,801,941 B1
(45) Date of Patent: Oct. 5, 2004

(54) DYNAMIC WIRELESS INTERNET ADDRESS ASSIGNMENT SCHEME WITH AUTHORIZATION

(75) Inventors: William Edward Stephens, Belle Mead, NJ (US); Harvey Waldman, Yardley, PA (US); Thomas Michael Stiller, Ewing, NJ (US); Nisha Pauline Newman, North Brunswick, NJ (US)

(73) Assignee: Sarnoff Corporation, Princeton, NJ (US)

( * ) Notice: Subject to any disclaimer, the term of this patent is extended or adjusted under 35 U.S.C. 154(b) by 687 days.

(21) Appl. No.: 09/633,669

(22) Filed: Aug. 7, 2000

Related U.S. Application Data

(60) Provisional application No. 60/148,625, filed on Aug. 12, 1999.

(51) Int. Cl.[7] ............................................. G06F 15/173
(52) U.S. Cl. ........................ 709/225; 709/226; 709/227; 709/245; 713/150; 713/155; 713/200
(58) Field of Search ............................... 709/225–227, 709/245; 713/150, 155, 200

(56) References Cited

U.S. PATENT DOCUMENTS

| | | | | |
|---|---|---|---|---|
| 5,434,918 A | * | 7/1995 | Kung et al. .................. 713/169 |
| 5,491,741 A | * | 2/1996 | Farwell et al. ............... 370/347 |
| 5,513,245 A | * | 4/1996 | Mizikovsky et al. ........ 455/411 |
| 5,544,245 A | * | 8/1996 | Tsubakiyama .............. 713/171 |
| 5,649,286 A | * | 7/1997 | Frerking .................... 455/435.1 |
| 5,708,655 A |   | 1/1998 | Toth et al. ................... 370/313 |
| 5,812,819 A |   | 9/1998 | Rodwin et al. ............. 395/500 |
| 5,907,541 A | * | 5/1999 | Fairholm et al. ........... 370/316 |
| 5,974,314 A | * | 10/1999 | Hudson ....................... 455/427 |
| 6,052,560 A | * | 4/2000 | Karabinis .................. 455/12.1 |
| 6,094,721 A | * | 7/2000 | Eldridge et al. ............. 713/168 |
| 6,192,474 B1 | * | 2/2001 | Patel et al. .................. 713/171 |
| 6,201,871 B1 | * | 3/2001 | Bostley et al. .............. 380/249 |
| 6,243,811 B1 | * | 6/2001 | Patel .......................... 713/167 |
| 6,246,874 B1 | * | 6/2001 | Voce .......................... 455/428 |
| 6,249,867 B1 | * | 6/2001 | Patel .......................... 713/167 |
| 6,278,876 B1 | * | 8/2001 | Joshi et al. .................. 455/427 |
| 6,304,564 B1 | * | 10/2001 | Monin et al. ............... 370/338 |
| 6,411,807 B1 | * | 6/2002 | Amin et al. ............. 455/432.3 |
| 6,421,732 B1 | * | 7/2002 | Alkhatib et al. ............ 709/245 |
| 6,434,627 B1 | * | 8/2002 | Millet et al. ................ 709/245 |
| 6,546,492 B1 | * | 4/2003 | Walker et al. .............. 713/200 |
| 2002/0068527 A1 | * | 6/2002 | Massingill et al. ........ 455/13.4 |
| 2002/0122420 A1 | * | 9/2002 | Yuan et al. .................. 370/389 |

OTHER PUBLICATIONS

Akyildtz, I.F. et al; "Mobility Management in Current and Future Communications Network", IEEE Network, IEEE Inc., vol. 12, No. 4, Jul. 1998, pp. 39–49.

* cited by examiner

*Primary Examiner*—Nabil El-Hady
(74) *Attorney, Agent, or Firm*—William J. Burke

(57) ABSTRACT

A method of assigning a unique IP address to a user of a mobile communication device in an OBS network allows for the dynamic assignment of IP addresses to users entering the OBS network. The OBS network includes a plurality of interconnected OBSs where each of the OBSs includes a user database including an OBS identifier, user identifier, assigned IP address, MAC hardware address, and beam identifier for each user in the network. The OBS network also includes a master ticketing authority that maintains a database of unique IP address that may be assigned to users entering the network, a gateway, a master routing database, and at least one mobile communication device in contact with an OBS. Users in the network are also authenticated through the transmittal of encrypted random numbers between a user authentication site and a mobile communication device.

25 Claims, 3 Drawing Sheets

DYNAMIC WIRELESS INTERNET ADDRESS ASSIGNMENT SCHEME WITH AUTHORIZATION

CROSS-REFERENCE TO RELATED APPLICATIONS

This application claims priority from U.S. provisional application Ser. No. 60/148,625, filed Aug. 12, 1999 and entitled "Dynamic Wireless Internet Address Assignment Scheme With Authorization", the entirety of which is hereby incorporated by reference.

FIELD OF THE INVENTION

This invention relates to dynamic IP addressing schemes, and more particularly to dynamic IP address assignment schemes for wireless devices in an OBS network.

BACKGROUND OF THE INVENTION

Using the Internet's set of communication protocols, the most common being Transmission Control Protocol over Internet Protocol (TCP/IP), each machine requires a unique Internet Protocol (IP) address in order to connect to the Internet. When a network is formed, an IP address must be assigned to each machine. To avoid manually entering an IP address at each computer when it enters the network or moves within the network, protocols have been developed that distribute IP addresses from a central point.

Examples of such protocols are the PPP Internet Protocol Control Protocol (IPCP) (RFC 1332) and the Dynamic Host Configuration Protocol (DHCP) (RFC 2131). With dynamic addressing, a device can have a different IP address each time that it connects to a network. The device's IP address may even change, in some systems, while it is connected to the network. A protocol such as DHCP also supports a mix of static and dynamic IP addresses.

The DHCP protocol uses "lease" time concepts for the amount of time that a given IP address will be valid for a computer. The lease time may vary depending on how long a user is likely to require the Internet connection at a particular location. Protocols, such as DHCP, are particularly useful in environments such as education where users change frequently. Using short lease times, the protocols can dynamically reconfigure networks where there are more computers than there are available IP addresses.

These dynamic address schemes have met with some success. However, there still remains a need to extend dynamic IP addressing to serve an On-Board-Switch (OBS) network and to connect OBS network users to the Internet.

SUMMARY OF THE INVENTION

The present invention provides a method of assigning an IP address to a user of a mobile communication device in an On-Board Switch (OBS) network. The method includes the steps of contacting an OBS within the OBS network using the mobile communication device, transmitting a user identifier and a MAC hardware address of the mobile communication device to the OBS, requesting an IP address from the OBS, requesting an IP address from a ticketing authority with the OBS, assigning a unique IP address to the user, transmitting the assigned IP address to the OBS, and transmitting the assigned IP address from the OBS to the mobile communication device.

The present invention also provides a method of authenticating a user in a network. The authentication protocol begins when the user enters a password into a MCD that is in communication with an authentication site. An encryption key is then derived from the password of the user, and the MCD transmits a first random number encrypted with the encryption key to the authentication site. The authentication site receives the encrypted first random number and transmits a second random number to the MCD. The MCD receives the transmitted second random number and retransmits the first random number encrypted with the encryption key and the received second number encrypted with the encryption key. The authentication site receives the encrypted first and second random numbers from the MCD and decrypts the numbers with a user authentication decryption key specific to the user and stored at the authentication site. The user is then authenticated if the decrypted received first and second random numbers match the second random number sent by the authentication site and the initial first random number received by the authentication site.

The above and other features of the present invention will be better understood from the following detailed description of the preferred embodiments of the invention which is provided in connection with the accompanying drawings.

A BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

The present invention provides a method of dynamically assigning an Internet Protocol (IP) address to users of wireless mobile communication devices (MCD) within a self-forming wireless On-Board Switch (OBS) network 10. An exemplary MCD according to this invention is a laptop computer, palm unit, or network accessible wireless telephone adapted to function as described hereafter. An application of this method is described hereafter using a military scenario, but the method has utility beyond a military application for self-forming OBS networks generally. For example, the present invention may be used in other scenarios where users are continuously entering and leaving an OBS wireless network, such as in exploration parties, survey parties, scientific expeditions, or search parties.

Figure 1:
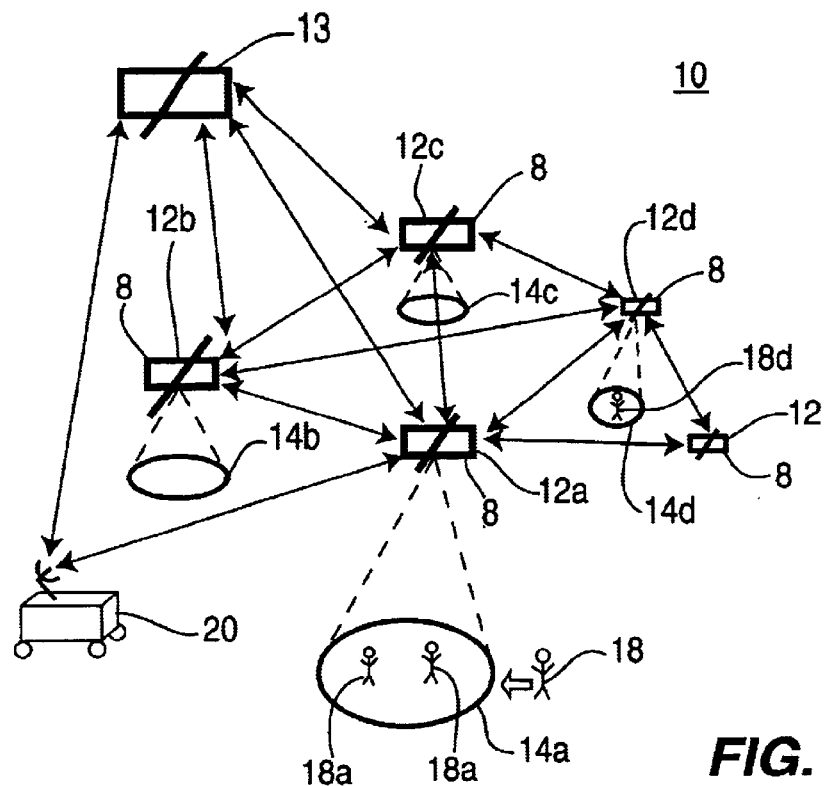
FIG. 1 is a diagram of an OBS network according to the present invention.

Referring to FIG. 1, an On-Board switch (OBS) network 10 is shown. The network 10 includes a plurality of air vehicles 8, each vehicle 8 including an OBS 12 (designated as OBSs 12*a*, 12*b*, 12*c*, 12*d*). The air vehicles 8 may be manned or unmanned vehicles such as planes, balloons, or satellites. Each OBS 12 is in communication with the other OBSs 12 in the network either directly or through an intermediary OBS 12.

Figure 2:
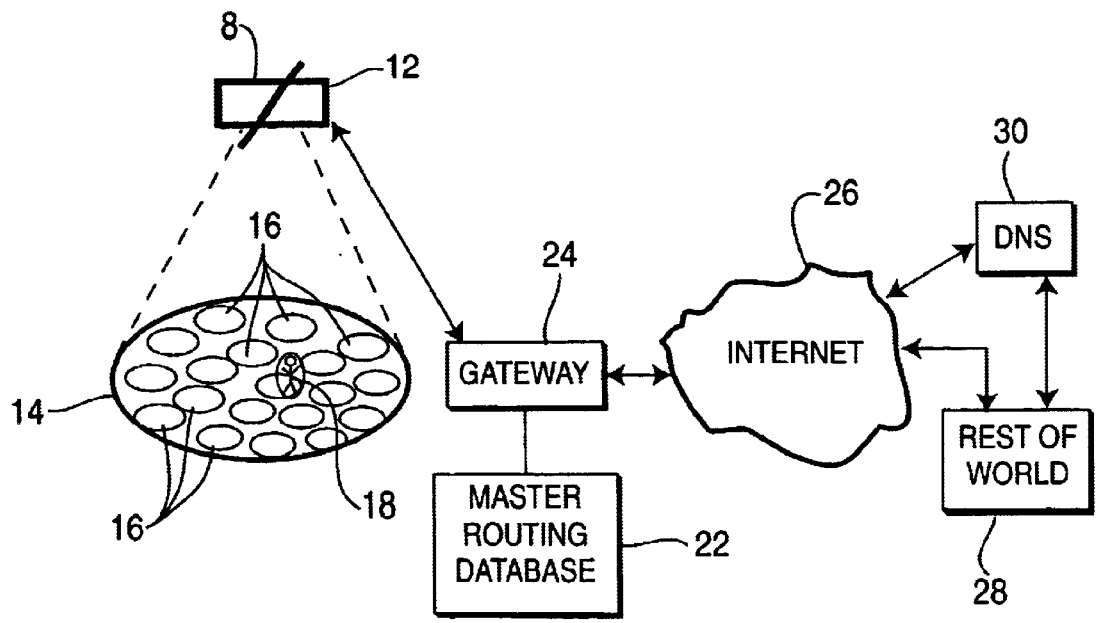
FIG. 2 is a diagram illustrating the connection of the OBS network of FIG. 1 to users outside of the network.

Each OBS 12 services a particular region designated as the OBS's footprint 14. Referring to FIG. 2, the footprint 14 of an OBS 12 is divided into at least one spot beam 16. Each spot beam 16 represents a particular region or area within the footprint of an OBS 12, and the OBS 12 is capable of identifying a spot beam 16 from which a transmitted signal originates. Each user 18 within a footprint is designated as a node within that footprint 14.

A user 18 of a MCD that wishes to enter the OBS network 10, as shown in FIG. 1, contacts an OBS 12 within the network. Each OBS 12 sends a beacon signal periodically. The MCD listens on the known signaling channel and contacts the OBS 12 with the strongest signaling strength, e.g., with the strongest signal-to-noise ratio. The user, through the MCD, transmits a user identifier and Media Access Control (MAC) hardware address of the MCD to the contacted OBS 12, here OBS 12a. The MCD may also send an authorization level request (e.g., confidential, secret, top secret) and a code word, such as a Diffie-Heliman Public Key Cryptosystem digital signature. The Diffie-Hellman signature is generated using a standard algorithm where the user has a public key and a private key. The public key is issued such that anyone can encode a message using the public key. However, only the private key may be used to decode the message. The MAC hardware address is an address that uniquely identifies an individual hardware MCD.

Each OBS 12 maintains a user database that includes dynamic and static information pertaining to a user. Although each user database need not include all data relevant to a specific user 18 in the network 10, it is preferable that each user database be redundant in order to preserve data in case of individual failures. The data contained in the user databases is described hereafter in conjunction with the method of assigning an IP address to a user 18.

The MCD, along with transmitting the user identifier and MAC hardware address to the OBS, transmits a request to join the network's governing protocol by being assigned an IP address. In response to this communication, the OBS 12a preferably stores the MAC hardware address under, or associated with, the user identifier for user 18 in its user database. The OBS 12a then requests a unique IP address from a ticketing authority 20, preferably located outside of a combat zone, or footprints 14 covered by the OBS network 10, in a military application. The ticketing authority 20 may communicate with individual OBSs 12 directly or through a satellite 13 in communication with OBSs 12. The ticketing authority 14 maintains a database of assigned and unassigned unique IP addresses and may be centralized or distributed to avoid a single point of failure. There are several known algorithms for distributed ticketing authorities which guarantee a unique IP address.

The ticketing authority 20 responds to the request by OBS 12a by assigning from its database a unique IP address to the user 18. This unique IP address may then be mapped to the location of the MCD of the user 18 as described below. The ticketing authority 20 then transmits the unique IP address to OBS 12a, which in turn transmits the assigned IP address to the MCD of the user 18. The MCD then preferably confirms receipt of the assigned IP address.

The OBS 12a is able to locate and contact an MCD within its footprint because it knows the MAC hardware address of the MCD and also knows, and has stored in its user database, the beam identifier for a MCD which has contacted the OBS 12a. OBS 12a preferably has stored in its user database the user identifier, IP address, MAC hardware address, and beam identifier for the user, along with any other users which it services, i.e., users within its footprint 14 which have previously contacted the OBS 12a and become a part of network 10. All communications between an MCD and an OBS may be time-out, such that a failure to complete a transaction within a specified time period requires a new request by the MCD.

The OBS 12a then contacts the other OBSs 12b, 12c, 12d in the network so that the OBSs 12b, 12c, 12d recognize that a new user 18 has entered the network 10. The OBS 12a transmits the user identifier of user 18 to the OBSs 12b, 12c, 12d, and the OBSs 12b, 12c, 12d store an OBS identifier for the user in their user databases. The OBS identifier simply identifies that, currently, user 18 is within the footprint 14 of, and is serviced by, OBS 12a. A master routing database 22 which is accessible to a gateway 24 for the network 12 is also updated, for example by master ticketing authority 20, to include the OBS identifier, IP address and user identifier of user 18. The gateway 24 may be an OBS or plurality of OBSs, a dedicated gateway 24, or an MCD within network 10. If more than one gateway 24 exists for the network 10, only one gateway is operative at any given time.

A server providing software applications to a user in the network 10 and in communication with and associated with an individual OBS 12 and preferably located on an air vehicle 8 with the associated OBS 12 is preferably a proxy server. Each proxy server is in communication with a master server located at a ground control station. The proxy server provides access to the files of the master server for the user.

In one embodiment of the present invention, the assigned IP addresses are Class B IP addresses. Class B IP addresses use the first two octets to identify the network 10 with a number from 128.1. through 191.254. The last two octets are available for host addresses, i.e., to identify the users 18, allowing for 16 bits of host addresses or 64,516 hosts.

Once a user 18 has been assigned a unique IP address as described above, the user 18 may be contacted from within the network 10 and from outside of the network 10. A user outside of the network 10, designated generally in FIG. 2 as the rest of the world 28, contacts a gateway 24 for the network 10 through Internet 26 in a conventional manner using the assigned IP address of user 18. This IP address may be obtained from a domain name system (DNS) 30 if unknown to the user using standard Directory Service protocol. A DNS 30 converts a domain name (e.g, XYZ.com) into an IP address, a 32-bit numeric address written as four numbers separated by periods. In a military scenario, OBS network 10 could be addressed by a domain name such as a particular battle name, and individual users could be addressed as "user@battle.mil." The address "user@battle.mil", then, can be translated by a DNS into the IP address assigned to the user.

Once the gateway 24 has been contacted, a data packet is sent to the gateway. The gateway 24 connects networks which may not share the same protocol. The gateway 24 retrieves the OBS identifier from the master routing database 22 for the user 18 having the IP address forwarded to the gateway 24. The gateway 24 then forwards the transmitted data packet to the OBS 12 identified by the retrieved OBS identifier. The OBS 12 retrieves a beam identifier and MAC hardware address for the user 18 having the transmitted IP address from its user database. Using the beam identifier and MAC hardware address, the OBS 12 then transmits the data packet to the node within its footprint 14, i.e., to the MCD having the MAC hardware address in a beam identified by the beam identifier.

Users 18a within network 10 may also contact each other. Assume a user 18a within a footprint 14a of OBS 12a attempts to contact user 18*d* within the footprint 14*d* of OBS 12*d*. User 18*a* contacts OBS 12*a* and transmits to OBS 12*a* a data packet to be delivered to user 18*d*. OBS 12*a* retrieves the OBS identifier for the user 18*d* from its database and identifies that OBS 12*d* services user 18*d*. OBS 12*a* then forwards the data packet destined for a MAC associated with user 18*d* to OBS 12*d*. OBS 12*d* then retrieves a beam identifier and MAC hardware address for the user 18*d* from its user database and transmits the data packet to the MCD having the retrieved MAC hardware address and located within the barn identified by the beam identifier.

Similarly, users 18 within the same footprint can contact each other through an OBS 12. It should be apparent that an OBS 12*a* servicing a user 18*a* that attempts to contact another user 18*a* within the OBS's footprint 14*a*, however, does not need to forward the data packet to another OBS 12. The OBS 12*a* knows which users are within its own footprint or retrieves its own OBS identifier from its user database. An OBS 12 then retrieves a MAC hardware address and beam identifier for the user 18 to be contacted, rather than forwarding the data packet to another OBS 12. The OBS 12*a* then transmits the data packet directly to the MCD of the user 18*a* to be contacted.

Figure 4:
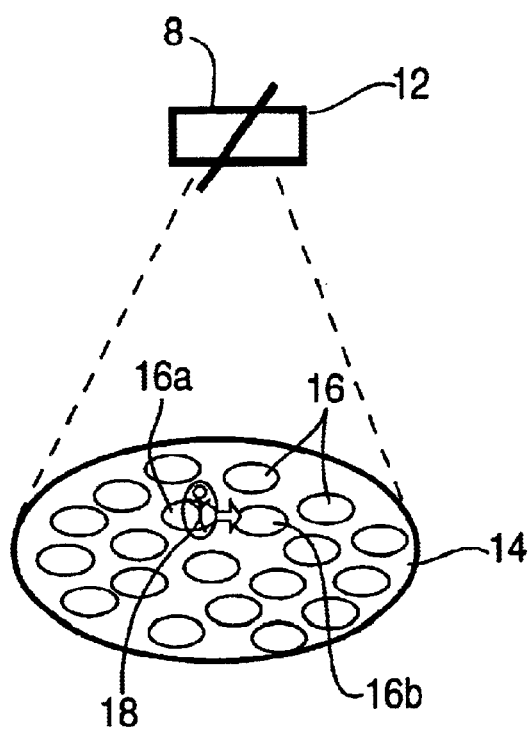
FIG. 4 is a diagram illustrating a user's movement between beams within a footprint of an OBS network.

FIG. 4 illustrates the movement of a user 18 within a beam 16*a* within a footprint 14 to a beam 16*b* within footprint 14. When such a beam-to-beam movement occurs, the OBS 12 having footprint 14 updates its user database with a new beam identifier identifying that user 18 and the user's MCD are located in beam 16*b*. This preferably occurs because the user's MCD is periodically in contact with OBS 12 in order to allow OBS 12 to identify the MCD's current beam location.

Figure 3:
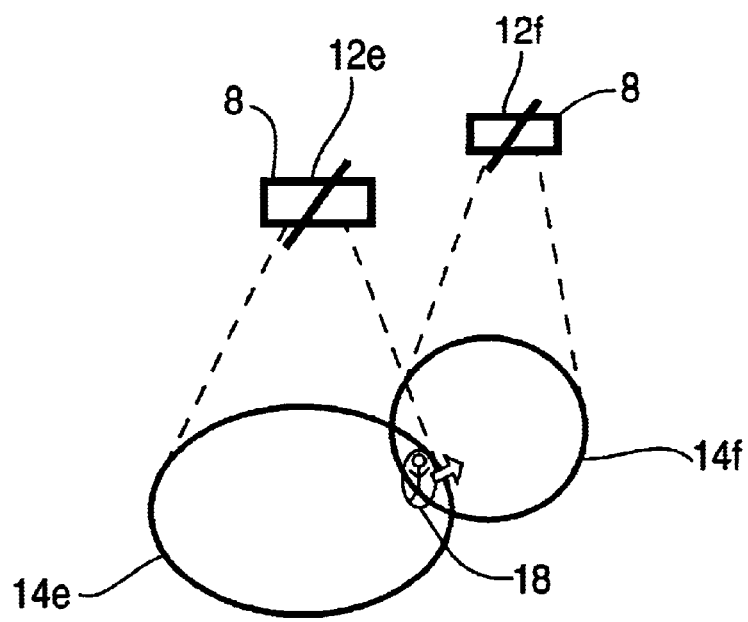
FIG. 3 is a diagram illustrating a user's movement between footprints within an OBS network.

Contrary to when a user 18 moves within a single footprint 14, a handoff of servicing responsibilities must occur when a user 18 moves between footprints 14, such as when the user physically moves to a new footprint or a footprint moves away from a user when the air vehicle 8 including an OBS is not stationary relative to user 18, or both. This scenario is illustrated in FIG. 3 where user 18 is shown moving from the footprint 14*e* of OBS 12*e* to the footprint 14*f* of OBS 12*f*. The MCD of user 18 is constantly monitoring a known signaling channel for the OBSs 12 in the OBS network 10. The signaling channel is preferably a combination of frequency, code, and time. For purposes of this illustration, it is assumed that OBS 12*e* is currently responsible for servicing user 18. Once the MCD determines that the signal-to-noise ratio on the signaling channel of another OBS 12*f* is greater than the signal-to-noise ratio of the servicing OBS 12*e*, the MCD contacts the OBS 12*f* having the stronger signal to noise ratio. The MCD transmits the user identifier of the user and its MAC hardware address to the OBS 12*f*. OBS 12*f* then contacts OBS 12*e* and requests that service responsibilities for user 18 be transferred to OBS 12*f*. OBS 12*e* then approves the request of OBS 12*e*, and the OBS 12*f* updates its user database for the user 18 to include the user identifier, IP address, MAC hardware address, and beam identifier for the user 18. The user database of OBS 12*f* may already contain some of this data, such as MAC hardware address, IP address, and user identifier if the user databases are redundant, or the OBS 12*f* can obtain this data from either OBS 12*e* or the MCD of user 18. The beam identifier now represents a beam within the footprint of OBS 12*f*, however, not OBS 12*e*. Either OBS 12*e* or OBS 12*f* preferably also contacts the other OBSs 12 in the network 10 to update the change in the OBS identifier for the user 18. The master routing table of the master routing database 22 of FIG. 2 is also preferably updated with the new OBS identifier for the user 18.

It should be understood that there are a number of possible addressing modes in the network and combinations of addressing modes, and the number of modes increases with more detailed user data stored in the user databases for each user. One possible addressing mode is a simple unicast message mode. A user inside the network 10 or a person outside of the network 10 should be able to contact every user in the network 10 with a message. A message sent from a user within the network is simply transmitted to the servicing OBS 12, which transmits the message to each user in its footprint and to each other OBS 12 in the network, which in turn transmit the message to the users within their footprints. A person outside of the network 10 can use the domain name of the network 10, which may be converted to an IP address addressing each user in the network, to send a message to each person in the network. The message is then forwarded from the gateway 24 to each of the OBSs 12 in the network 10.

It is also possible to broadcast a message to a specific geographic region. A message identified to be delivered to a specific geographic region can be forwarded to the OBSs having footprints within the identified region, and the OBSs can broadcast the message to the entire footprint or beams within the footprint, as appropriate. Basically, the specified geographic region may be translated into the OBSs and specific beams within the OBSs covering the geographic region.

Other possible addressing modes include addressing a group by functionality (e.g, to all users identified as tank operators) or by rank (e.g, to all commanders). Another possible addressing mode is multicast where a pre-specified group is identified. The user identifiers in the group can be forwarded to an OBS 12 and then the message can be forwarded to the OBSs 12 servicing the persons identified in the group for transmittal. It should also be apparent that intersections of the above identified examples of addressing modes are also possible, such as, for example, addressing all commanders within a specific region.

The structure of an exemplary user database maintained by each OBS 12 is described hereafter. Each OBS 12 maintains a user database with static and dynamic user specific information. The user information is preferably redundant in all databases, and the OBSs 12 preferably maintain an updated copy of all the user information at each OBS 12. Some OBS specific user information, such as beam identifier and MAC hardware address maintained in one OBS 12, however, may not be useful to another OBS 12.

Each user database preferably includes unique user identification data which may include a user identifier, such as a military ID or entity name, a user name, and a Class B IP address for permitting connections from outside of the network. The user database may also include user qualifying information, such as a user specialty (e.g., rifleman, Tube-launched Optically-tracked Wire-guided missile (TOW) operator, medical, communicator, etc. . . . ), and radio network capability, such as whether the MCD of the user is a high power radio or whether the MCD has gateway capabilities. The user databases may also include user authentication information (described below) and user dynamic addressing information. The user dynamic addressing information includes the OBS identifier, beam identifier, and MAC hardware address associated with the user. Further, the user database may include user status update information, such as whether the user is dead or alive.

An exemplary database structure includes three tables identical in all OBSs:

Static_info, Dynamic_info, and Additional_info. A fourth table, OBS_specific, may be unique to each OBS and comprise location information about users associated with the particular OBS. The attributes of exemplary tables may be summarized as follows:

Static_info:
EntityID: The militaryID/user identifier—string
Name: The entity's name—string
Specialty: A unique number assigned to all possible functionalities—integer
RadioChars: A unique number assigned to all possible radio capabilities—integer
AuthCode1: A user authentication encryption key—integer
AuthCode2: A user authentication decryption key—integer Comments: string
Dynamic_info:
EntityID: The militaryID/user identifier—string
IPAddress: integer/string
ObsID: integer
User_status: (in network) or (out of network)—integer
OBS—specific:
EntityID: The militaryID/user identifier—string
BeamID: integer
NodeID: The MAC hardware address—integer
In_transition: This is used during transition from one OBS to another OBS. This will have a NULL value, which implies the entity is still within this OBS. If In_transition is not NULL, then it specifies the ObsID of the OBS to which the entity now belongs—integer
Additional_info:
EntityID: The militaryID/user identifier—string
User_status: integer These databases may be easily defined, accessed, and updated using known database languages, such as Structured Query Language (SQL).

| | |
|---|---|
| (code 1): | CREATE TABLE Static_info(EntityID varchar(32), Name varchar(64), IPAddress int32, Specialty int16, RadioChars int16, AuthCode1 int32, AuthCode2 int32, Comments varchar(64)); |
| (code 2): | CREATE TABLE Dynamic_info(Entity varchar(32), OBSID int8, User_status int4); |
| (code 3) | CREATE TABLE OBS_specific(EntityID varchar (32), BeamID int16, NodeID int16, In_transition int4); and |
| (code 4) | CREATE TABLE Additional_info(EntityID varchar(32), User_status int4). |

An OBS identifier may be retrieved from the user database after the destination-EntityID is extracted from the sender's packet using the following code: SELECT ObsID FROM Dynamic_info where EntityID=destination-EntityID. Also, once the OBS identifier has been retrieved and the data packet is forwarded to the OBS identified by the OBS identifier, the In_transition field is set if the entity just moved to another OBS and the other OBSs in network 10 may not have updated information. The user database may be queried as follows: SELECT BeamID NodeID In_transition FROM OBS_specific where EntityID= destination-EntityID. Then, if the In_transition field has not been set, the data packet is transmitted in the channel specified by the BeamID and NodeID. If the In_transition field has been set, the data packet may be forwarded to the appropriate OBS.

The present invention also includes a method of authenticating a user in a wireless network. A user entering a network, such as OBS network 10, contacts an authentication site. The authentication site is preferably located on at least one of the OBSs 12. Mirrored authentication sites may be present on additional OBSs 12 in case a primary authentication site is destroyed and to share authentication responsibilities when required by high traffic loading or if the primary authentication site's position precludes effective communication with a user's MCD.

Figure 5:
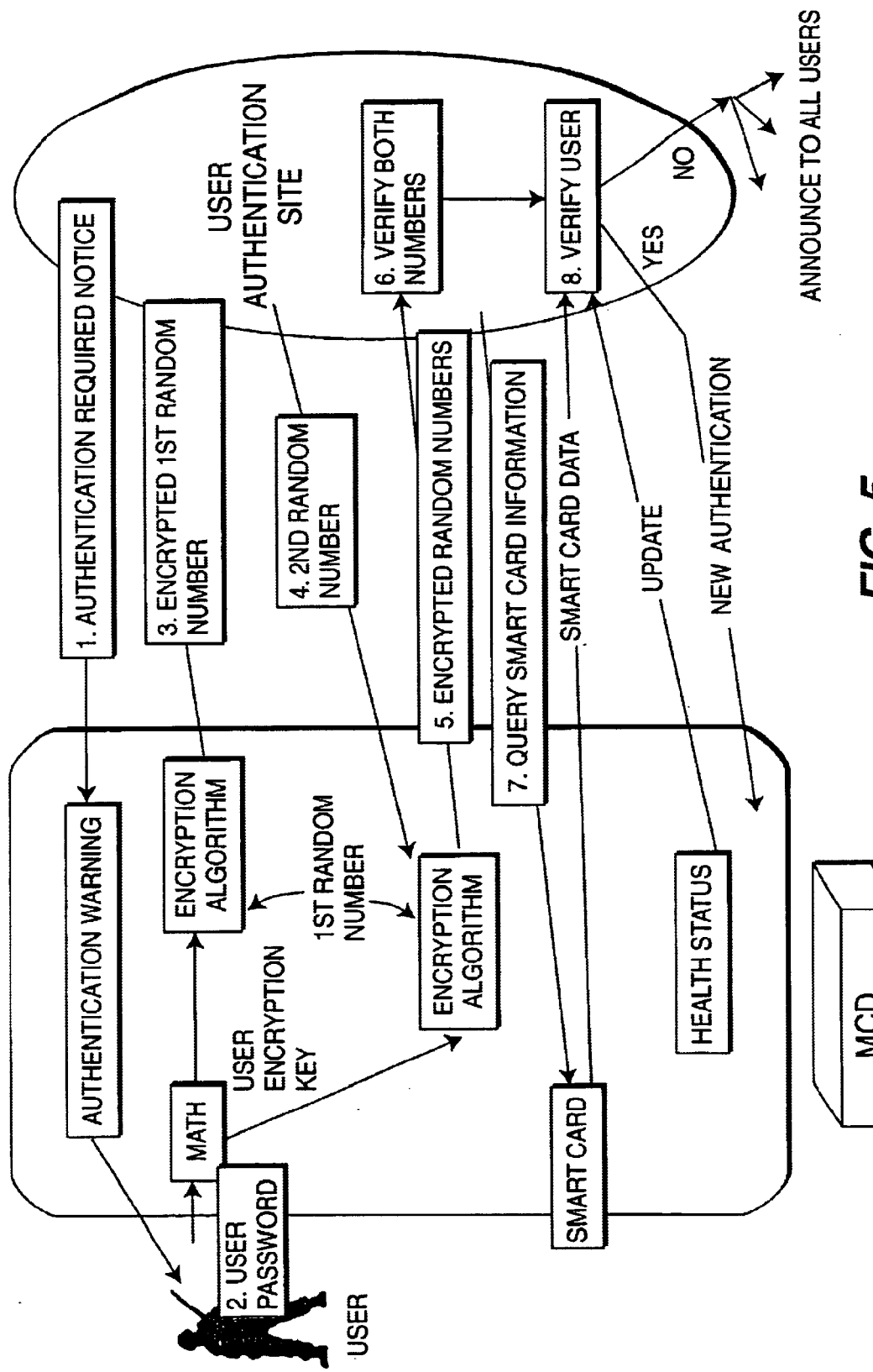
FIG. 5 illustrates the steps of an authentication and re-authenticating protocol according to the present invention.

The re-authentication protocol illustrated in FIG. 5 begins when an authentication site requests re-authentication. The authentication protocol as described hereafter then begins. The authentication protocol begins when the user enters a password into a MCD that is in communication with the aforementioned authentication site. An encryption key is then derived from the password of the user, and the MCD transmits a first random number encrypted with the encryption key to the authentication site. The authentication site receives the encrypted first random number and transmits a second random number to the MCD. The MCD receives the transmitted second random number and retransmits the first random number encrypted with the encryption key and the received second number encrypted with the encryption key. The authentication site receives the encrypted first and second random numbers from the MCD and decrypts the numbers with a user authentication decryption key specific to the user and stored at the authentication site. The user is then authenticated if the decrypted received first and second random numbers match the second random number sent by the authentication site and the initial first random number received by the authentication site.

Additional authentication data may also be transmitted to the authentication site. This authentication data may be downloaded from a smart card connected to the MCD, encrypted, and transmitted to the authentication site. This authentication data may then be decrypted by the authentication site and be verified against authentication data stored at the authentication site.

The above-described authentication protocol helps to maintain the mission value of a network during, for example, periods of combat. One of the elements of network security is the authentication of valid users to prevent the enemy or other hostiles from performing acts that could do a wide range of damage to the mission and/or the network itself. Once entering a network, a hostile party could accomplish a wide range of damaging acts, such as acquiring key tactical intelligence, obtaining information about specific individuals, units or equipment, pass misinformation to forces, or possibly destroy the network.

The authentication as described above is very unobtrusive to the individual users within the network. The authentication protocol reduces user interaction requirements to a minimum while maintaining the security of its database. It also provides a high degree of security against direct attack.

Authentication data security is maintained because user identification and authentication data reside at the authentication site only, including each user's unique encryption and decryption keys employed only for authentication. No authentication data are stored on any user's MCD and the user authentication encryption key is derived from his or her password. Further, to obtain additional security, a user's MCD may derive network access keys (TRANSEC and COMSEC security keys) from the MCD's time-of-day clock. All communications are preferably encrypted with both message and transport keys, e.g., the TRANSEC and COMSEC keys. Further, if the user is authenticated and new transport and message keys are required, a new method of obtaining them from the MCD's clock is sent to the MCD. Also, status indicators, such as health sensors preferably, must indicate that the user is alive to maintain MCD and network access.

The authentication protocol preferably demands re-authentication of a user after a predetermined period of time, as illustrated in FIG. 5. The user is warned, such as by a skin sensation, visual, or audible warning, that re-authentication is required. The authentication steps as described above are preferably repeated to re-authenticate a user. A user is also preferably de-authenticated if a status indicator changes. A user may be connected to a health monitor, such a pulse monitor, that effectively indicates whether the user is alive or dead. If the monitor indicates that the user's status is deceased, then the user may be automatically de-authenticated. De-authentication amounts to removal of the user as a part of the network.

Although various embodiments of the present invention have been illustrated, this is for the purpose of describing, but not limiting the invention. Various modifications which will become apparent to one skilled in the art, are within the scope of this invention described in the attached claims.

What is claimed is:

1. A method of assigning an IP address to a user of a wireless mobile communication device in an OBS network, comprising the steps of:
    contacting an On-Board Switch (OBS) within said OBS network using said mobile communication device;
    transmitting a user identifier, and a MAC hardware address of said wireless mobile communication device to said OBS;
    requesting an IP address from said OBS;
    requesting an IP address from a ticketing authority with said OBS;
    assigning a unique IP address to said user;
    transmitting said assigned IP address to said OBS;
    transmitting said assigned IP address from said OBS to said wireless mobile communication device; and
    storing said user identifier, said MAC hardware address, a beam identifier for said user, and said assigned IP address for said user as user data in a user database maintained by said OBS.

2. The method of claim 1, further comprising the following steps:
    updating user data stored in the user database maintained by said OBS;
    updating user data stored in user databases maintained by other OBSs in said OBS network, said user data stored in said user databases maintained by said other OBSs including an OBS identifier and user identifier for each user in said OBS network, an OBS identifier of an individual user identifying an OBS servicing said individual user; and
    updating a master routing database in communication with a gateway of said OBS network, said master routing database including an OBS identifier, a user identifier, and an assigned, IP address for each user.

3. The method of claim 2, further comprising the step of contacting a user within said OBS network from outside of said OBS network, said user having an assigned IP address, said step of contacting comprising the steps of:
    contacting said gateway of said OBS network using said assigned IP address of said user to be contacted;
    transmitting a data packet to said gateway;
    retrieving an OBS identifier for said user having said assigned IP address from said master routing database;
    forwarding said data packet to an OBS identified by said OBS identifier;
    retrieving a beam identifier and MAC hardware address of said user having said assigned IP address from a user database of said identified OBS; and
    transmitting said data packet to a wireless mobile communication device having said MAC hardware address in a beam identified by said beam identifier.

4. The method of claim 3, further comprising the step of obtaining said assigned IP address from a domain name system.

5. The method of claim 2, further comprising the step of contacting a first user within said OBS network by a second user within said OBS network, said step of contacting comprising the steps of:
    contacting an OBS servicing said second user;
    transmitting a data packet to said OBS servicing said second user;
    retrieving an CBS identifier for said first user from a user database of said OBS servicing said second user;
    forwarding said data packet to an OBS identified by said OBS identifier if said first user is not served by said OBS servicing said second user;
    retrieving a beam identifier and MAC hardware address for said first user to from a user database of said OBS identified by said OBS identifier; and
    transmitting said data packet to a wireless mobile communication device having said MAC hardware address and located within a beam identified by said beam identifier.

6. The method of claim 2, further comprising the step of updating a user database of an OBS servicing a user in said OBS network to include a new beam identifier when said user and wireless mobile communication device move from a first beam in a footprint of said OBS to a second beam in said footprint of said OBS.

7. The method of claim 2, further comprising the steps of:
    monitoring an OBS signaling channel with said wireless mobile communication device;
    contacting an OBS with a signal strength stronger than an OBS servicing said wireless mobile communication device;
    transmitting a user identifier, MAC hardware address, and IP address to said OBS with said stronger signaling strength;
    contacting said servicing OBS with said OBS with said stronger signaling strength;
    requesting that servicing responsibilities for a user identified by said user identifier be transferred to said OBS with said stronger signaling strength;
    approving said request with said servicing OBS;
    updating user data stored in a user database of said OBS having said stronger signaling strength, said user data including said user identifier, said IP address, said MAC hardware address, and a beam identifier for said user;
    updating user data stored in user databases maintained by each other OBS in said OBS network to include a new OBS identifier for said user, and
    updating said master routing table to include said new OBS identifier for said user.

8. The method of claim 2, wherein each OBS user database includes a MAC hardware address, an assigned IP address, an OBS identifier, a user identifier, and a beam identifier for each user in said OBS network, the step of updating user data stored in user databases maintained by other OBSs in said OBS network further includes the step of updating each user database with said MAC hardware address, said beam identifier, and said IP address for said user.

9. The method of claim 2, further comprising the steps of:
   identifying a selected group of users to be contacted by a second user, said selected group identified by user data or combination of user data;
   contacting an OBS servicing said second user;
   transmitting a data packet to said OBS servicing said second user;
   forwarding said data packet to all OBSs servicing said selected group; and
   transmitting said data packet to a wireless mobile communication devices within said selected group.

10. The method of claim 9, wherein said selected group is organized by geographic region, user identifier, functionality, rank, status, or combination thereof.

11. The method of claim 1, wherein said IP address is a class B IP address.

12. The method of claim 1, wherein said master ticketing authority is located outside of said OBS network.

13. The method of claim 1, further comprising the step of authenticating said user, the step of authenticating comprising the steps of:
   contacting an OBS user authenticating site with said wireless mobile communication device;
   inputting a password into said wireless mobile communication device; deriving an encryption key from said password;
   transmitting a first random number encrypted with said encryption key to said authentication site from said wireless mobile communication device;
   transmitting a second random number from said authentication site to said wireless mobile communication device after receiving said first random number;
   transmitting said first and second random numbers encrypted with said encryption key to said authentication site from said wireless mobile communication device;
   receiving said encrypted first and second random numbers from said wireless mobile communication device;
   decrypting said received encrypted first and second random numbers with a user authentication decryption key stored at said authentication site; and
   authenticating said user if said decrypted first and second random numbers match said first and second random numbers.

14. The method of claim 13, further comprising the steps of encrypting authentication information with said encryption key, transmitting said encrypted authentication data to said user authentication site, decrypting said encrypted authentication data with said user authenticating decryption key, and verifying said authentication data against stored user authentication data.

15. The method of claim 13, wherein said OBS network includes at least two user authentication sites.

16. An On-Board Switch (OBS) network, comprising:
   a plurality of interconnected OBSs, each of said OBSs including a user database storing user data, wherein said user data includes, a user identifier for each user in said network, an IP address for each user serviced by said OBS, a MAC hardware address for a wireless mobile communication device used by each user serviced by said OBS, and a beam identifier for each user serviced by said OBS;
   a master ticketing authority in communication with said OBSs, said master ticketing authority maintaining a database of unique assigned and unassigned IP addresses;
   a gateway providing access to said OBS network from outside of said OBS network; and
   a master routing database in communication with said gateway, wherein said master routing database includes a user identifier, an OBS identifier, and an IP address for each user in said OBS network.

17. The OBS network of claim 16, wherein each user database further comprises functionality, rank, or status data, or combination thereof, for each user in said OBS network.

18. The OBS network of claim 16, wherein each user database includes an IP address, a MAC hardware address, a beam identifier, an OBS identifier, and a user identifier for each user in said OBS network.

19. The OBS network of claim 16, further comprising at least one wireless mobile communication device in communication with an OBS within said OBS network.

20. The OBS network of claim 16, wherein said IP addresses are class B IP addresses.

21. The OBS network of claim 16, wherein said master ticketing authority is disposed outside of footprints of said OBSs.

22. The OBS network of claim 21, wherein said master ticketing authority is a distributed ticketing authority.

23. The OBS network of claim 16, further comprising a domain name system.

24. The OBS network of claim 16, further comprising at least one user authenticating site.

25. The OBS network of claim 24, wherein said authenticating site is located on at least one OBS within said network.

* * * * *

UNITED STATES PATENT AND TRADEMARK OFFICE
CERTIFICATE OF CORRECTION

PATENT NO. : 6,801,941 B1
DATED : October 5, 2004
INVENTOR(S) : William Edward Stephens et al.

It is certified that error appears in the above-identified patent and that said Letters Patent is hereby corrected as shown below:

<u>Title page, Item [54] and Column 1, lines 1-3,</u>
Title, change the title to read -- DYNAMIC ASSIGNMENT OF INTERNET ADDRESSES TO WIRELESS MOBILE COMMUNICATION USERS IN AN ON-BOARD SWITCH NETWORK --.

<u>Column 3,</u>
Line 16, change "Heliman" to -- Hellman --.

<u>Column 5,</u>
Line 10, change "barn" to -- beam --.

<u>Column 7,</u>
Line 43, add -- As an example, the following code may be used to define the tables: --.

<u>Column 9,</u>
Line 28, replace "OBS" with -- On-Board Switch (OBS) --.
Line 30, replace "On-Board Switch (OBS)" with -- (OBS) --.

<u>Column 10,</u>
Line 23, replace "CBS" with -- OBS --.

<u>Column 11,</u>
Line 20, change "a wireless" to -- all wireless --.

Signed and Sealed this

Twenty-sixth Day of July, 2005

JON W. DUDAS
*Director of the United States Patent and Trademark Office*